United States Patent [19]
Borghans

[11] 4,366,517
[45] Dec. 28, 1982

[54] MAGNETIC ERASING HEAD

[75] Inventor: Joseph H. Borghans, Heerlen, Netherlands

[73] Assignee: U.S. Philips Corporation, New York, N.Y.

[21] Appl. No.: 182,191

[22] Filed: Aug. 28, 1980

Related U.S. Application Data
[63] Continuation of Ser. No. 17,226, Mar. 5, 1979.

[30] Foreign Application Priority Data

Mar. 28, 1978 [NL] Netherlands .......................... 7803231

[51] Int. Cl.³ .............................................. G11B 5/27
[52] U.S. Cl. .................................................... 360/118
[58] Field of Search .......................................... 360/118

[56] References Cited
U.S. PATENT DOCUMENTS
3,846,840 11/1974 Childers et al. ...................... 360/118

Primary Examiner—Robert S. Tupper
Attorney, Agent, or Firm—Joseph P. Abate

[57] ABSTRACT

A magnetic erasing head for use in a radio receiver/tape recorder combination, includes a housing, a core unit of ferrite and an electrical winding. The housing has an opening which leaves a surface of the core unit free for cooperation with a record carrier to be erased. In order to control the generation of higher harmonics of the erasing frequency which might interfere in particular with radio reception on the medium wave range, the core unit is constructed with an entirely open rear circuit. In other words, the usual closing part is absent.

1 Claim, 5 Drawing Figures

MAGNETIC ERASING HEAD

This is a continuation, of application Ser. No. 017,226, filed Mar. 5, 1979.

BACKGROUND OF THE INVENTION

The invention relates to a magnetic erasing head for use in a radio-receiver/tape recorder combination, comprising a housing having an aperture in a surface thereof, a core unit formed by at least two core parts of a sintered oxidic ferromagnetic material and having ends which enclose an erasing gap between them, and an electric winding provided on at least one of the core parts. The core unit is accommodated in the housing such that the aperture leaves the ends of the core parts free for cooperation with a magnetizable record carrier to be erased.

Magnetic erasing heads serve to magnetize the magnetic material of a record carrier at least into a state of magnetic saturation so as to cause magnetic modulations previously provided on the record carrier to disappear and then subsequently to demagnetize the material of the record carrier by an alternating magnetic field decreasing to zero. The core unit of magnetic erasing heads may be composed in various manners. It is not unusual to construct a head core unit as a magnetic circuit built up from two C-shaped core parts of sintered oxidic ferromagnetic material (so-called ferrite), in which the blunt ends of the C's face each other (see, for example, Winckel "Technik der Magnetspeicher" (1960), pp. 51-52). In the plate where a record carrier is intended to be conveyed past the unit, the magnetic circuit is interrupted by a so-called erasing gap. Usually a foil of non-magnetizable material is provided between the ends of the core parts in the plate. It is also known to press the opposite ends of the core parts, in the place which is not contacted with the record carrier, directly against each other without the interposition of a foil.

When an erasing head of the above-described type is used in a combined radio receiver-tape recorder, undesired interference effects may occur in the radio reception (in particular in the medium wave band range) of the receiver. Similar interference effects can occur when a separate tape recorder is combined with a separate radio receiver, for example, when a number of audio components are accommodated in a rack installation.

Tests have shown that these interference effects are due to the presence of microscopic roughness of the confronting ferrite surfaces in the region where the ferrite core parts are directly pressed against each other. Due to this roughness, the surfaces are not in full contact with each other throughout the whole surface area but only in a multiplicity of point contact areas. When the magnetic circuit is flux-loaded, the point contact areas will rapidly become magnetically saturated. As a result of occurring non-linear phenomena, higher harmonics of the erasing frequency are generated. The resulting radiation may interfere with the radio reception of the receiver.

It was generally assumed in the art to be possible to grind and polish surfaces of ceramic ferrite material to such a high degree of smoothness, that the magnetic resistance in a place where two polished ferrite surfaces contacted each other would be much smaller than in a place where two surfaces of a metallic magnetic material contacted each other (see, for example, Snoek: "New Developments in Ferromagnetic Materials" (1947), p. 69). Therefore, the cause of interference effects detected in radio reception of radio receiver-tape recorder combinations was not sought in radiation of higher harmonics of the erasing frequency caused by local asperities on the contact surfaces of the core parts.

SUMMARY OF THE INVENTION

It is an object of the invention to provide an erasing head for use in radio receiver/tape recorder combinations in which, during erasing, the radiation of higher harmonics of the erasing frequency interfering with the radio reception is reduced.

Therefore, the magnetic erasing head according to the invention is characterized in that the core unit forms a magnetic circuit which is entirely open on the side opposite to the erasing gap.

Entirely open herein does not mean the possible presence of one or more (auxiliary) gaps in the part of the magnetic circuit opposite to the erasing gap (the so-called rear circuit construction), but the absence in the rear circuit of a magnetic structural component or closing part.

Although it might have been expected that, by using an erasing head having an entirely open rear circuit such as by omitting the closing part, the erasing head would produce more interfering radiation on the rear side, it was surprisingly found that, in radio reception in the medium wave range, the interference radiation or, specifically, the radiation of higher harmonics of the erasing frequency is suppressed significantly as compared with an erasing head having a substantially closed rear circuit. This reduces the efficiency of the head only slightly. This efficiency reduction can readily be compensated by, for example, passing a somewhat greater current flow through the associated electric winding.

In a core unit consisting of two core parts, the erasing gap may be filled in a known manner with non-magnetic material, for example, in the form of a plastic foil. In order to obtain a greater erasing effect, a foil of a soft magnetic metal flanked by two non-magnetic foils may form a so-called triplex head construction.

Another manner of obtaining a better erasing effect is to construct an erasing head by means of a core unit consisting of three core parts (two L-shaped and one I-shaped part) positioned so as to enclose between them two erasing gaps. This forms a so-called double gap head construction. In this case, three locations where higher harmonics of the erasing frequency can be radiated may advantageously be eliminated by omitting the closing part which closes the magnetic circuit on the rear side. These three locations are the three contact surfaces of the closing part with each of the core parts.

A preferred embodiment of the erasing head in accordance with the invention, therefore, is characterized by a core unit consisting of two L-shaped core parts, and an I-shaped core part. The I-shaped core part has first and second long sides which are mutually opposite while each L-shaped core part has a short limb and a long limb; each short limb has a blunt end. Each L-shaped core part is disposed with its blunt end registered with and opposite to respective long sides of the I-shaped core part to form, respectively, first and second erasing gaps.

An additional advantage is that the omission of the closing part reduces the cost due to both a material savings and a simpler assembly, especially in erasing heads having a tripartite core unit as described above.

BRIEF DESCRIPTION OF THE DRAWING

The invention will be described in greater detail, by way of example, with reference to the accompanying drawing, in which.

DESCRIPTION OF THE PREFERRED EMBODIMENTS

Figure 1:
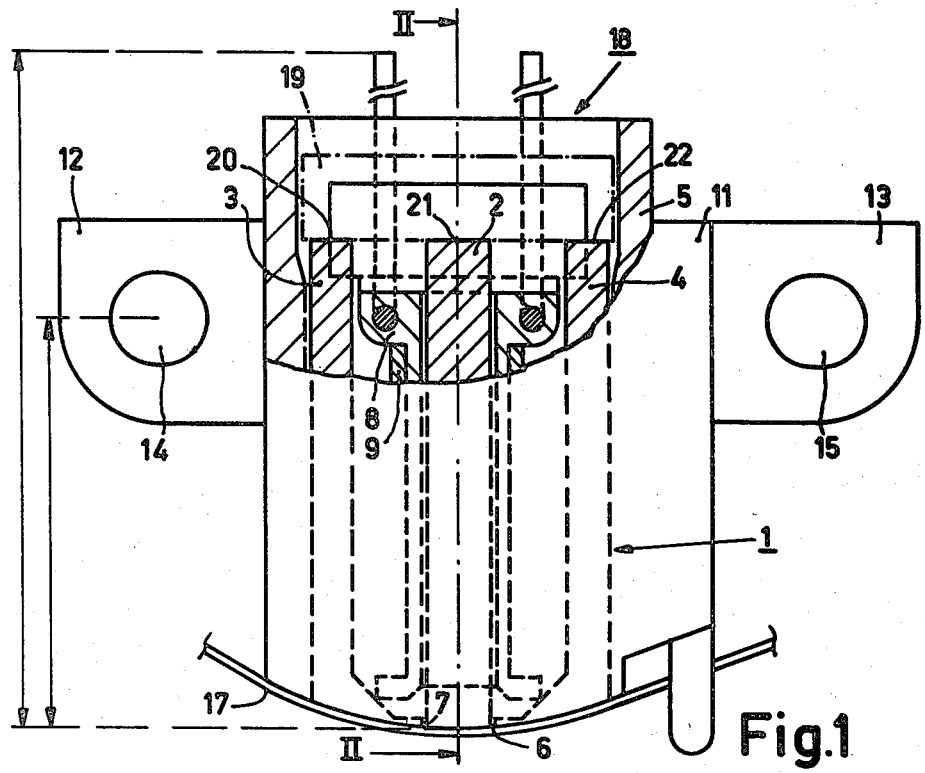
FIG. 1 is a side view, elevational partly broken away, of an erasing head according to the invention.
Figure 2:
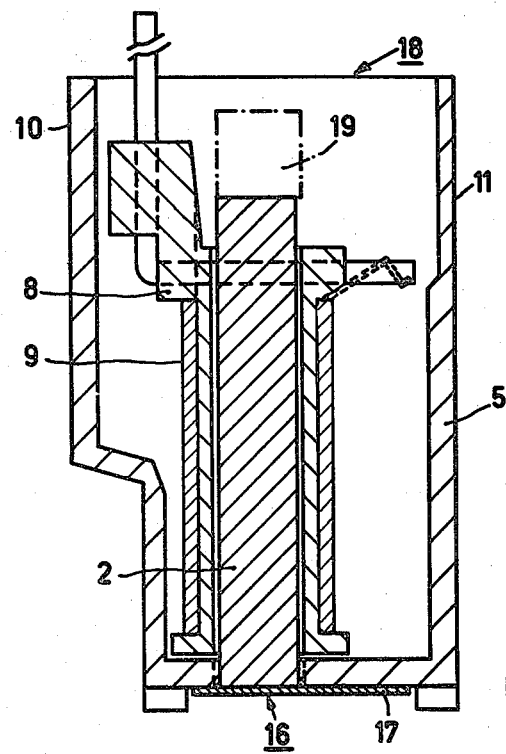
FIG. 2 is a cross-sectional view taken on the line II—II in FIG. 1.

In FIGS. 1 and 2, a core unit 1 which is constructed from three core parts 2, 3 and 4 of ferrite is accommodated in a housing 5 of a non-magnetic material. The core parts 3 and 4 are L-shaped and the core part 2 is I-shaped. A coil former 8 carrying an electric erase winding 9 is slid on the I-shaped core part 2. A first erasing gap 6 is formed between the core parts 2 and 4 and a second erasing gap 7 is formed between the core parts 2 and 3 (the gap widths are approximately 80 microns). The housing 5 which consists of one piece but which might alternatively consist of two or more pieces has an upper side 11 shown partly broken away, and an oppositely located lower side. The lower side has two studs 12 and 13 having bores 14 and 15 which secure the head in a tape deck of a tape recorder.

The assembly of the erasing head is carried out by sliding the core unit 1 into the housing 5. For correct positioning of the core unit 1, the housing 5 has internal frames guiding the core unit 1. An opening 16 in the housing leaves the ends of the core unit 1 free for cooperation with a record carrier 17. The housing is filled with a synthetic resin through an open rear side 18.

The usual position of a closing part 19 which is required for a conventional erasing head but which is omitted in the erasing head of the invention is denoted by a broken line. In the conventional head, the closing part 19 contacts the core parts 2, 3 and 4 in the places 20, 21 and 22 over a multiplicity of points. When the magnetic circuit is flux-loaded, said point contacts rapidly become magnetically saturated. As a result of occurring non-linear phenomena, higher harmonics of the erasing frequency which interfere with radio reception in the medium wave range are radiated. When the closing part 19 is omitted, the interfering radiation, in a given case 30 to 60 dB, is more suppressed by comparison with that present in the conventional erasing head having a closed rear circuit.

Figure 3:
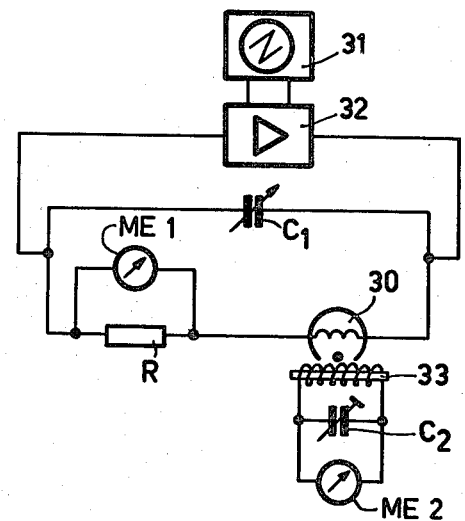
FIG. 3 a circuit diagram of test apparatus for measuring the interference radiation level of an erasing head.

FIG. 3 is a circuit diagram of a test apparatus designed to measure the interference radiation level of an erasing head. This circuit comprises an oscillator 31 which can generate a sinusoidal signal having a frequency of 60 kHz to energize an electric winding of an erasing head 30 to be tested. The signal of the oscillator 31 is amplified by means of an amplifier 32. The erasing head 30 forms part of an oscillatory circuit which further comprises a variable tuning capacitor $C_1$ by means of which the circuit is caused to resonate. The erasing head 30 then acts as a "radio transmitter" and radiates signals at a given frequency.

These signals are picked up by a radio receiver circuit which is placed at a standard distance of seven centimeters from the head 30 and which comprises an antenna coil 33 and a variable capacitor $C_2$. The receiver circuit is tuned to a frequency corresponding to the ninth harmonic of the signal of the erasing head (540 kHz) by adjusting capacitor $C_2$ until a voltmeter ME2 gives a maximum needle deflection. This deflection is a measure of the radiation level of the erasing head under test. By means of a minivolt meter ME1 connected across a measuring resistor R (0.1 Ohm), the current which flows through the electric winding of the erasing head 30 can be measured.

Figure 4:
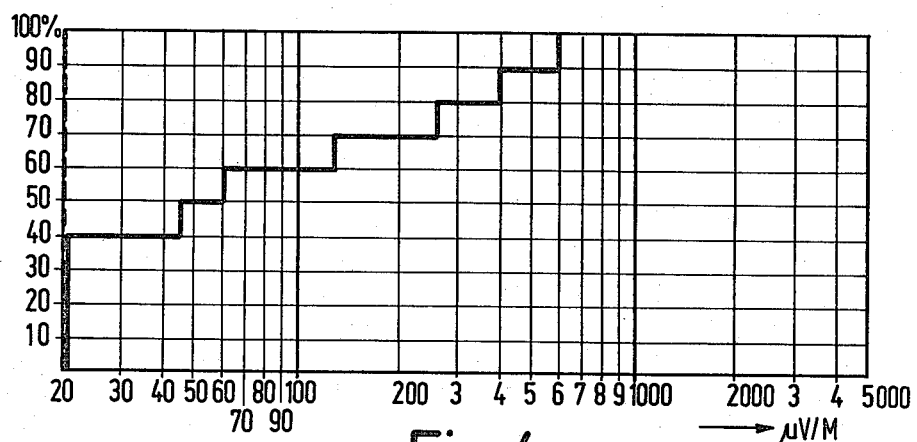
FIGS. 4 and 5 are graphs in which the interference radiation level in microvolts/meter is plotted on a horizontal axis and the percentage of heads out of a measured number of heads which showed a given interference radiation level is plotted on a vertical axis.
Figure 5:
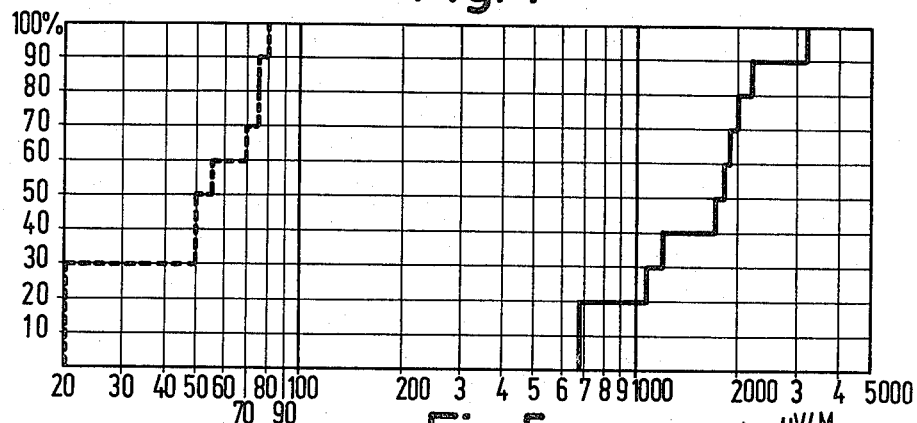

The results of measurements performed in the above-described manner on two series of an equal number of heads are shown in FIGS. 4 and 5.

One series consisted of conventional erasing heads having a closing part in the rear circuit; the heads were improved to such an extent that their closing parts were each provided with a thin layer of plastics in a thickness of a few tens of microns. The measured results hereof are denoted by a solid line.

The other series consisted of heads according to the invention having an entirely open rear circuit construction. The measured results hereof are denoted by a broken line.

The interference radiation level in $\mu V/m$ is always plotted on the horizontal axis and the percentage of the number of measured head on the vertical axis.

The results of FIG. 4 are determined for a minimum current level through the erase winding necessary for erasing a $CrO_2$ tape of 75 mA (conventional heads) and 90 mA (heads according to invention). The two current levels are due to the difference in head efficiency.

The results of FIG. 5 are for a (maximum) current of 125 mA (conventional heads) and 150 mA (heads according to the invention), respectively.

The heads are incorporated in recorders in which the erasing current is adjusted between the minimum and maximum values.

FIG. 4 shows that, with a minimum sufficient energization current, the interference radiation level of none of the erasing heads of the series according to the invention exceeded 20 $\mu V/m$. (This was the minimum value capable of being measured with the circuit arrangement described. In the series of erasing heads with a (plasticized) part in the rear circuit, 60% had an interference radiation level exceeding 20 $\mu V/m$ and 10% even had an interference radiation level of 600 $\mu V/m$.

FIG. 5 shows that, with a maximum energization current, none of the erasing heads of the invention exceeded a radiation level of 80 $\mu V/m$. In the series of the erasing heads having a (plasticized) rear part, not one met this requirement. The lowest measured radiation level was 650 $\mu V/m$ (for 20% of the heads), but 50% of the heads had a radiation level exceeding 1800 $\mu V/m$.

What is claimed is:

1. A magnetic erasing head for use in radio receiver/tape recorder combinations, comprising a housing, a core unit formed by core parts of a sintered oxidic ferromagnetic material and having ends which enclose erasing gaps between them, and an electric erase winding provided on one of the core parts, a surface of the housing having an aperture, the core unit being disposed in the housing such that said ends of the core parts are exposed through said aperture for cooperation with an associated magnetizable record carrier to be erased, characterized in that all of said core parts except at said erasing gaps are spaced apart to form completely open magnetic circuits remote from said erasing gaps to thereby minimize the generation of interference signals which are higher harmonics of the frequency of an erase signal, said core unit comprising two L-shaped core parts and an I-shaped core part, said I-shaped core part having first and second long sides which are mutually opposite, each L-shaped core part having a short limb and a long limb, each short limb having a blunt end, one of said L-shaped core parts being disposed with said blunt end thereof registered with and opposite to said first long side of said I-shaped core part to form a first erasing gap, the other of said L-shaped core parts being disposed with said blunt end thereof registered with and opposite to said second long side of said I-shaped core part to form a second erasing gap, and said erase winding is disposed on said I-shaped core part.

* * * * *